(12) United States Patent
Wilcox et al.

(10) Patent No.: US 7,668,309 B2
(45) Date of Patent: Feb. 23, 2010

(54) PORTABLE ACCESSORY HOLDER

(76) Inventors: Bud Wilcox, 13395 Bass Trail, Grass Valley, CA (US) 95945; Amy Wilcox, 1435 Liholiho St., Apt. 4, Honolulu, HI (US) 96822

( * ) Notice: Subject to any disclaimer, the term of this patent is extended or adjusted under 35 U.S.C. 154(b) by 521 days.

(21) Appl. No.: 11/422,722

(22) Filed: Jun. 7, 2006

(65) Prior Publication Data

US 2007/0036352 A1    Feb. 15, 2007

Related U.S. Application Data

(60) Division of application No. 10/430,743, filed on May 6, 2003, now abandoned, which is a continuation of application No. 09/459,156, filed on Dec. 10, 1999, now abandoned.

(60) Provisional application No. 60/164,661, filed on Nov. 9, 1999.

(51) Int. Cl.
*H04M 1/00* (2006.01)
*H04M 9/00* (2006.01)

(52) U.S. Cl. ...................................... 379/455; 379/454

(58) Field of Classification Search .............. 379/440, 379/446, 449, 451, 454, 455; 206/320, 38.1; 220/350, 737, 739; 224/197, 181–182, 250–251, 224/245, 269, 275, 281, 420, 482, 483, 435, 224/547, 542; 248/313, 311.2

See application file for complete search history.

(56) References Cited

U.S. PATENT DOCUMENTS

| 5,745,565 A | * | 4/1998 | Wakefield | 379/446 |
| 6,189,755 B1 | * | 2/2001 | Wakefield | 224/542 |
| 6,396,925 B1 | * | 5/2002 | Close | 379/446 |
| 2002/0094078 A1 | * | 7/2002 | Edwards | 379/428.01 |
| 2002/0094079 A1 | * | 7/2002 | Edwards | 379/454 |
| 2004/0086112 A1 | * | 5/2004 | Hilger et al. | 379/455 |

FOREIGN PATENT DOCUMENTS

| GB | 2439985 A | * | 1/2008 |
| JP | 10138816 A | * | 5/1998 |

* cited by examiner

*Primary Examiner*—Curtis Kuntz
*Assistant Examiner*—Phylesha Dabney
(74) *Attorney, Agent, or Firm*—Temmerman Law Office; Mathew J. Temmerman

(57) ABSTRACT

A portable electronic accessory holder for insertion into an existing vehicle cup holder includes a body having a continuous side wall that is sized to be received within the vehicle cup holder and an upper surface that coincides with at least a portion of the side wall. A pair of spaced sides extend upwardly from the upper surface to thereby define a gap therebetween. The gap is dimensioned to receive and hold a portable accessory, such as a portable phone, with the upper surface defining a support surface for the portable accessory. One or more cavities may also be located in the holder for providing multiple mounting positions for portable accessories.

2 Claims, 7 Drawing Sheets

PORTABLE ACCESSORY HOLDER

This application is a Divisional application of U.S. application Ser. No. 10/430,743 filed on May 6, 2003, now abandoned, which is a continuation of U.S. application Ser. No. 09/459,156 filed on Dec. 10, 1999, abandoned, which claims the benefit of U.S. Provisional Application No. 60/164,661 filed on Nov. 9, 1999.

FIELD OF THE INVENTION

This invention relates generally to the field of vehicle accessories and holders for portable electronic accessories, such as portable phones.

BACKGROUND OF INVENTION

The prior art has numerous cradles and clips for holding a portable phone, but each of these relies on grasping the phone from behind or supporting it in a tight-fitting tray. The prior art devices require elaborate anchoring systems to attach them to the car.

The present invention overcomes the shortcomings of the prior art by providing a simple light-weight device that uses available anchoring systems.

SUMMARY OF THE INVENTION

According to one aspect of the invention, a portable electronic accessory holder for insertion into an existing vehicle cup holder includes a body having a continuous side wall that is sized to be received within the vehicle cup holder and an upper surface that coincides with at least a portion of the side wall. A pair of spaced sides extend upwardly from the upper surface to thereby define a gap therebetween. The gap is dimensioned to receive and hold a portable accessory, such as a portable phone, with the upper surface defining a support surface for the portable accessory.

According to a further aspect of the invention, a portable electronic accessory holder for insertion into an existing vehicle cup holder includes a body having a continuous side wall that is sized to be received within the vehicle cup holder and an upper surface that coincides with at least a portion of the side wall. A first cavity is formed within the body and is sized for receiving a first portable accessory, such as a portable phone. A second cavity is formed within the body and is sized to receive a second portable accessory, such as a writing implement.

DETAILED DESCRIPTION OF THE INVENTION

Figure 1:
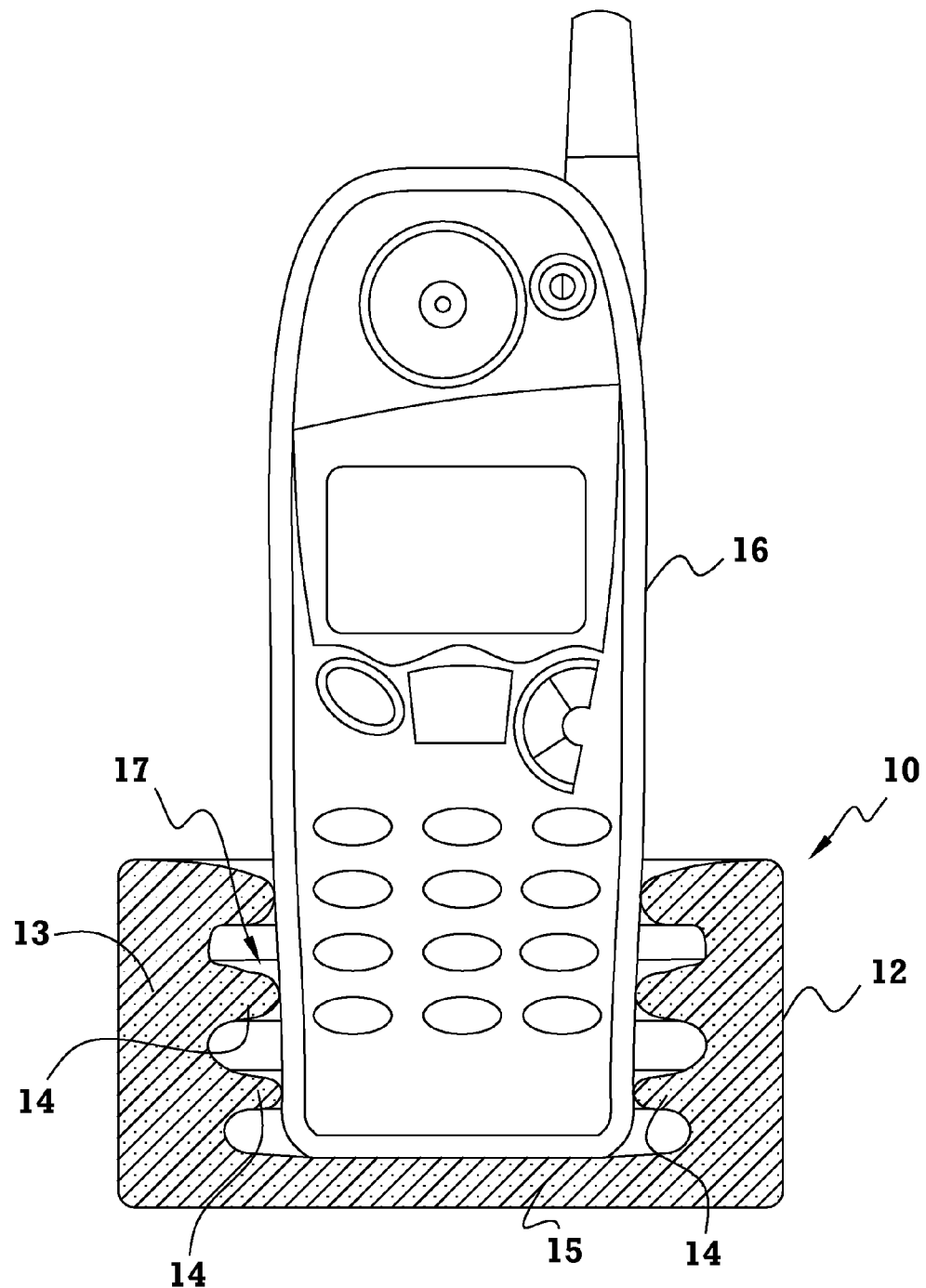
FIG. 1 is a sectional view of a phone holder in accordance with the present invention with a phone installed.

Referring now to the drawings, and to FIGS. 1-3 and 5 in particular, a phone holder 10 is preferably constructed of a foam polymer material, neoprene, or other low cost material that will not mark or mar the finish of a phone 16 it holds. The phone holder 10 is adaptable to various phone designs and sizes using existing anchoring systems, e.g., a cupholder of a vehicle, so that the phone holder is easily accessible.

The phone holder 10 includes an annular body 12 with a continuous side wall 13 that defines a cavity 17 and accordion-like protrusions or ribs 14 that extend into the cavity 17 from the side wall to grasp a phone 16 about its base and body. The variation in the shape of the protrusions offers some resistance when the phone is inserted to thereby grasp the phone. This positive grasp provides a convenient and safe method of storing the phone while operating a vehicle. The body 12 may also include a bottom 15, although the phone is generally held from the sides rather than supported from the bottom.

Figure 2:
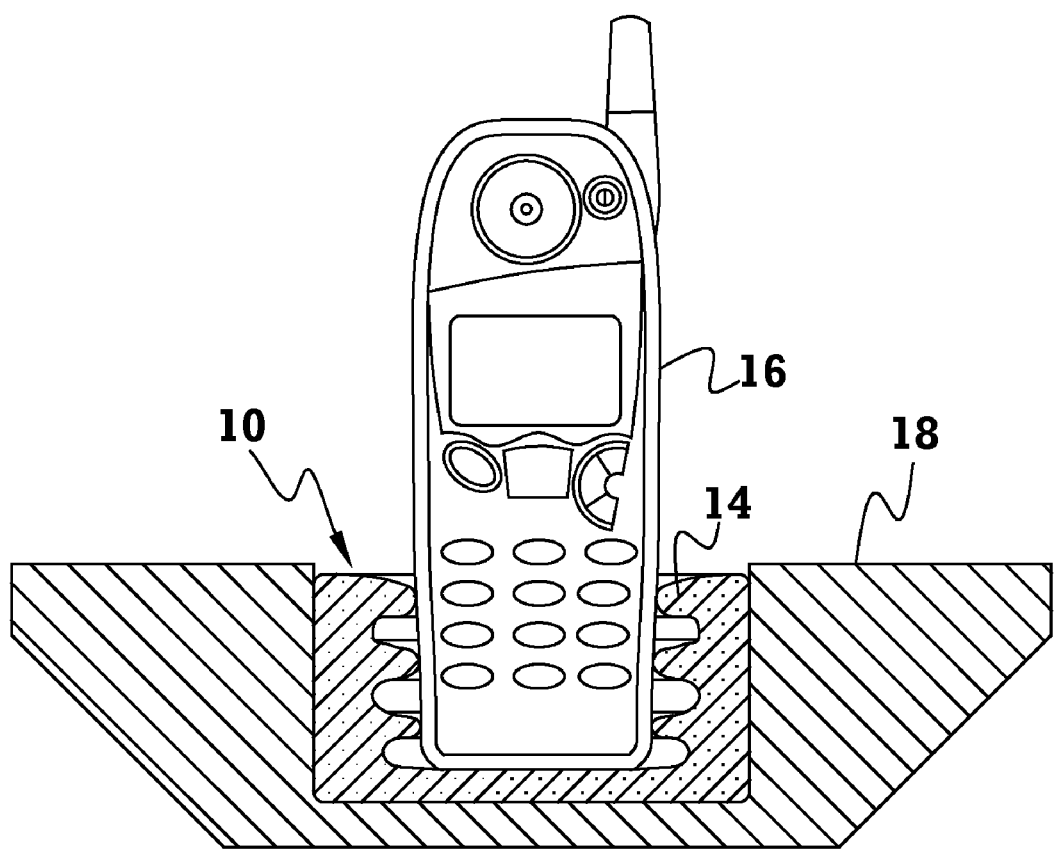
FIG. 2 is a sectional view of the phone holder of FIG. 1 inserted into a vehicle cup holder.
Figure 3:
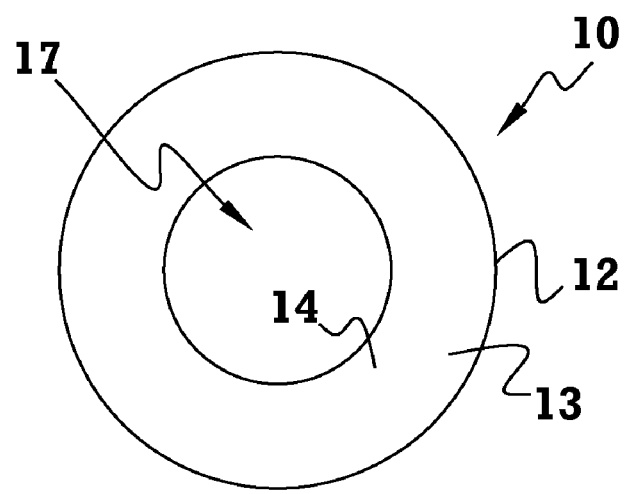
FIG. 3 is a top plan view of the phone holder.

As shown in FIG. 2, the phone holder 10 is positioned in a cup holder 18 of a vehicle. The phone holder 10 fits all standard cup holders and can be adapted to fit larger cup holders by using a larger outer dimension or using annular shims of similar material.

Figure 4:
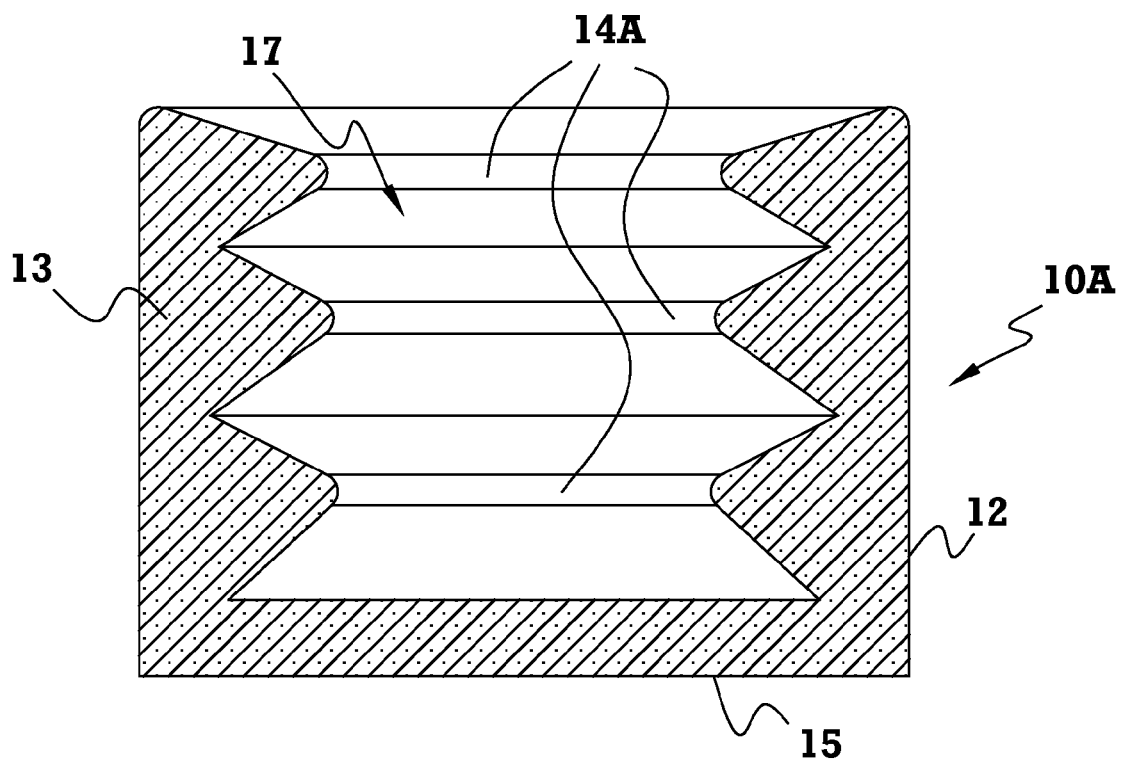
FIG. 4 is a sectional view of a phone holder in accordance with a further embodiment of the invention.

FIG. 4 shows a sectional view of a phone holder 10A in accordance with a further embodiment of the invention wherein like parts in the previous embodiment are represented by like numerals. As shown, each of the accordion-like protrusions 14A are of similar cross sectional shape to thereby create variations in diameter of the continuous side wall 13 of the phone holder 10A. The protrusions 14A provide increasing resistance to compression based upon the larger amount of material near the continuous side wall 13.

Figure 5:
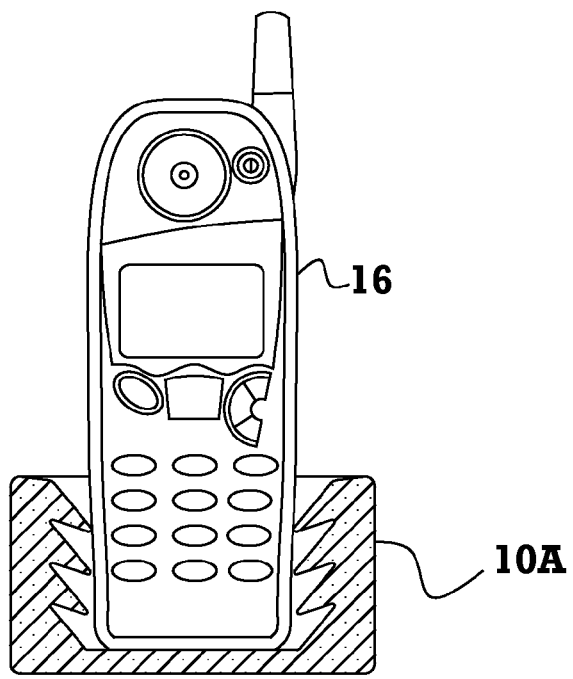
FIG. 5 is a sectional view of the phone holder of FIG. 4 showing a phone being inserted into the holder which in turn is inserted in the cup holder of a vehicle.

FIG. 5 shows a phone 16 placed in the phone holder 10 which in turn can be inserted in a cup holder 18 of a vehicle (FIG. 2).

Figure 6:
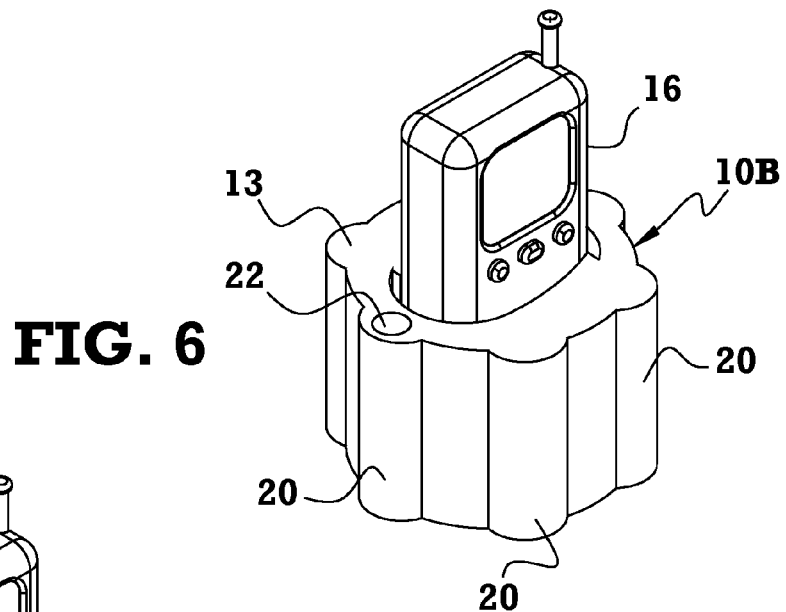
FIG. 6 is a perspective view of a phone holder in accordance with yet a further embodiment of the invention with a phone inserted therein.
Figure 7:
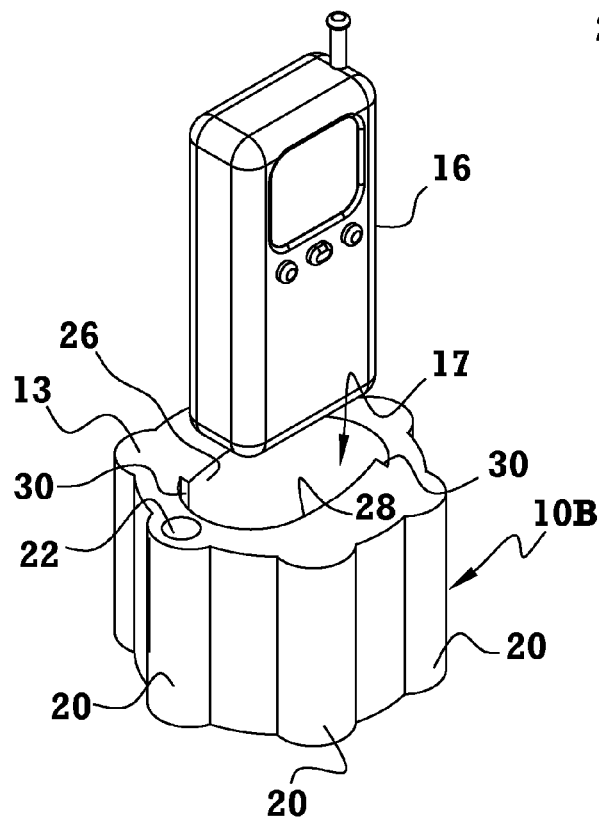
FIG. 7 shows a perspective view of the phone holder of FIG. 6 with the phone removed.
Figure 8:
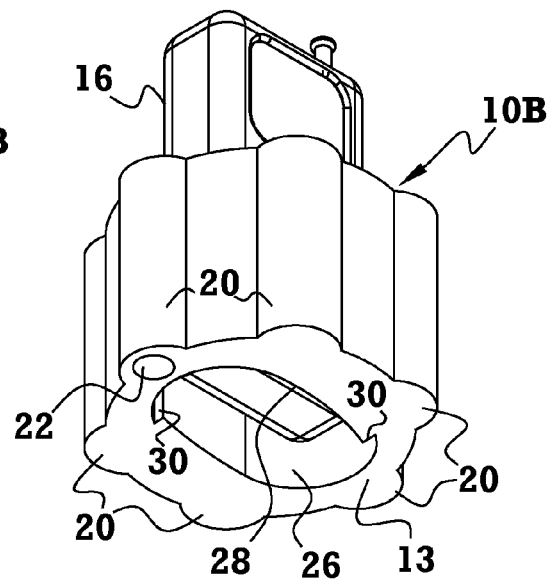
FIG. 8 is a bottom perspective view of the phone holder of FIG. 6.
Figure 9:
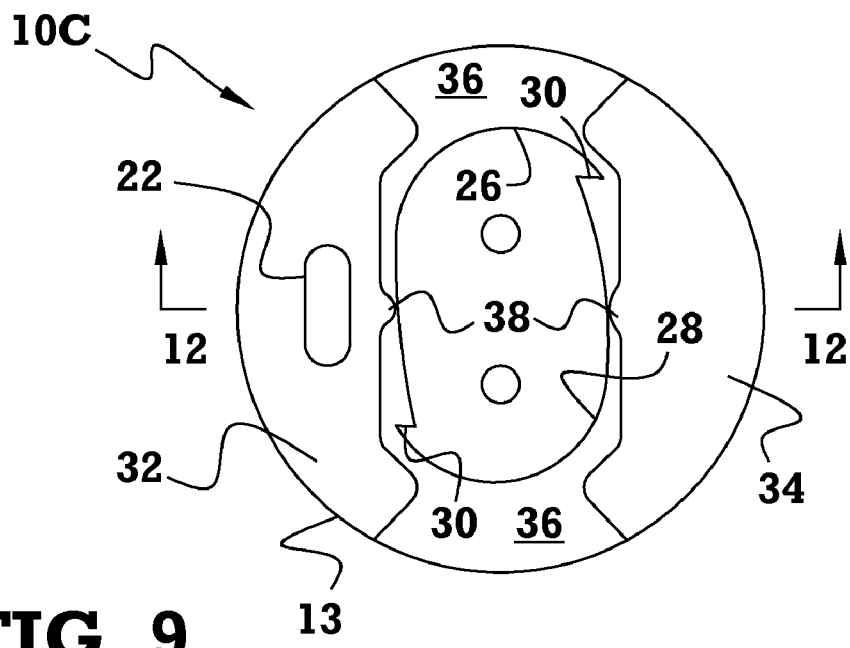
FIG. 9 is a top plan view of a phone holder in accordance with a further embodiment of the invention.
Figure 10:
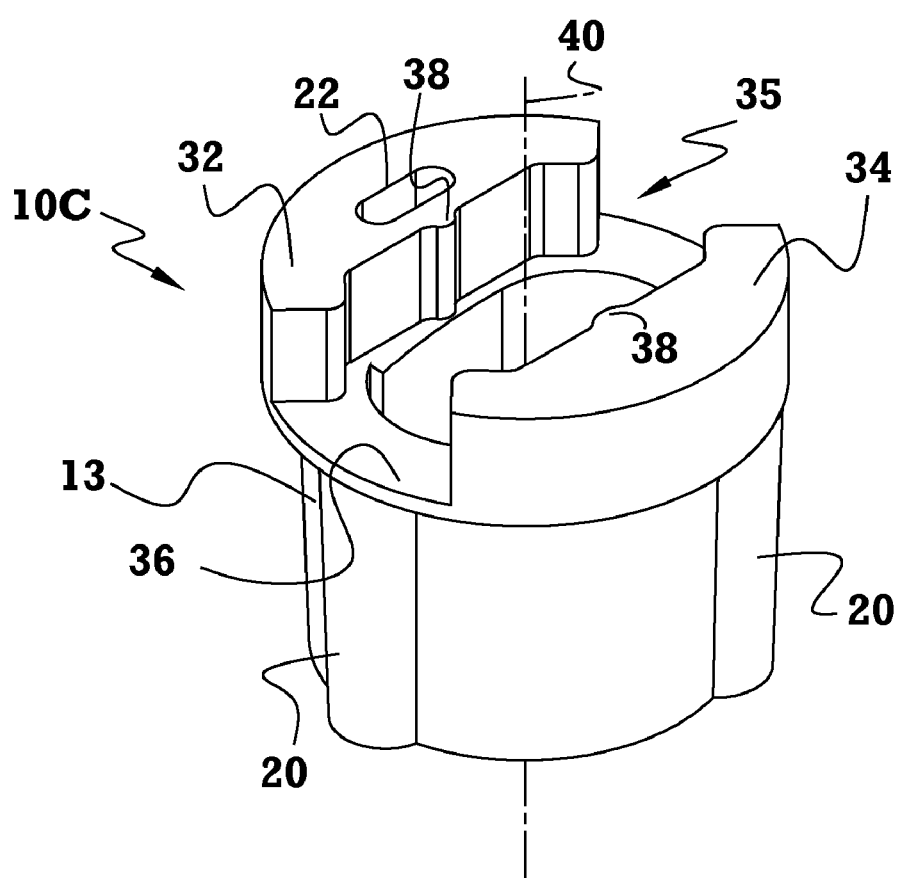
FIG. 10 is an orthographic view of the FIG. 9 embodiment.
Figure 11:
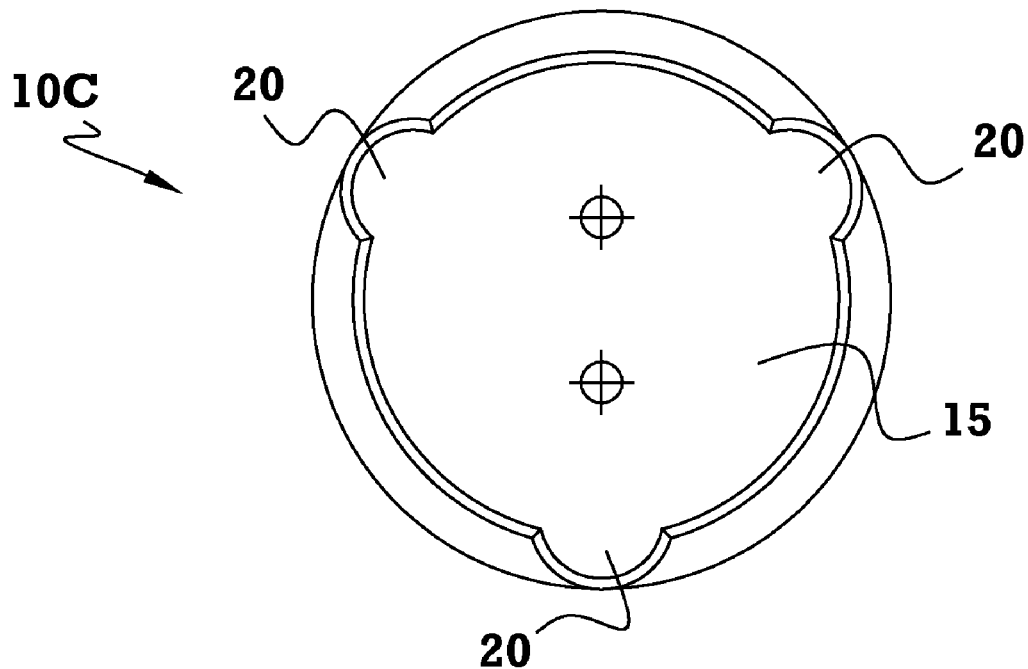
FIG. 11 is a bottom plan view of the FIG. 9 embodiment.

Referring now to FIGS. 6-8, a phone holder 10B in accordance with a further embodiment of the invention is shown. The phone holder 10B is preferably constructed of a soft foam polymer material and includes protrusions or ribs 20 positioned on the outer surface of the body 12. The ribs 20 are semi-circular in cross-section and extend parallel with a central axis of the body 12. The location of the ribs 20 provides a snug fit of the phone holder 10B within the vehicle cup holder 18 (FIG. 2). A second cavity 22 may be provided in the side wall 13 for receiving a writing instrument, such as a pen or pencil. The phone holder 10B avoids the use of ribs on the interior by providing a cam-shaped interior 24 with opposing cam segments 26 and 28. The widest orientation of the interior 24 is when the phone is aligned with stops 30 at the ends of the cam segments 26 and 28, into which the phone is inserted. The phone is then twisted to move along the ever decreasing radius of the cavity 17 until it is secured and grasped by the cam segments. As shown in FIG. 7, a bottom 15 may be provided. However, it will be understood that the phone holder 10B may be constructed without a bottom.

Figure 12:
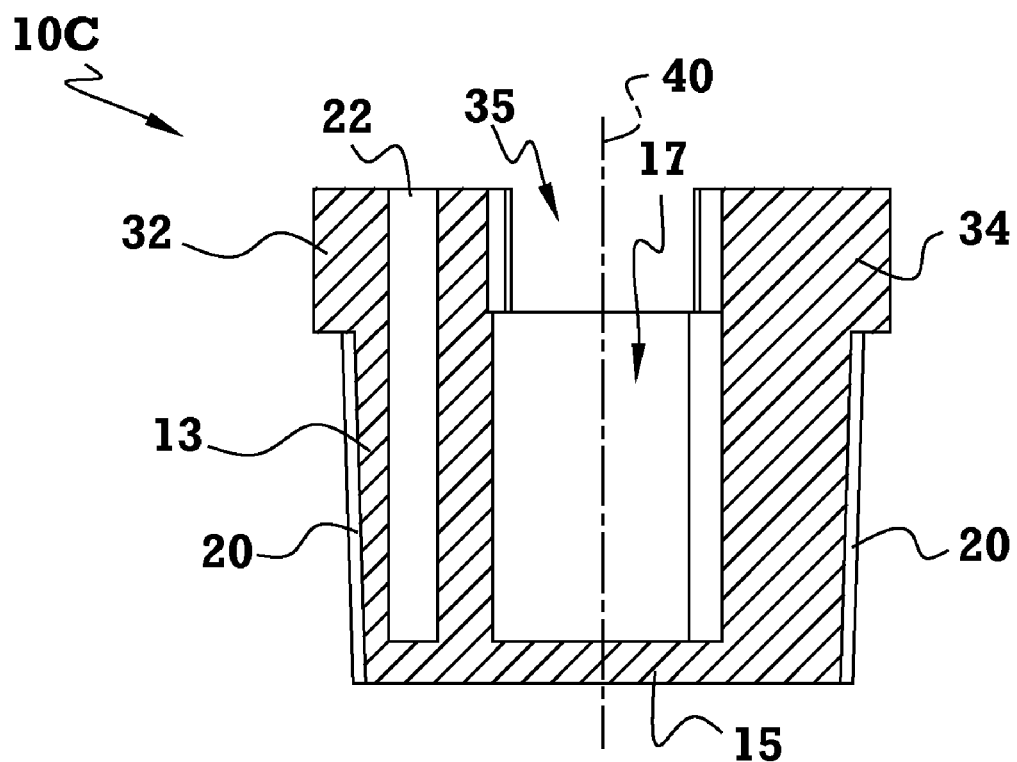
FIG. 12 is a sectional view of the phone holder taken along line 12-12 of FIG. 9.
Figure 13:
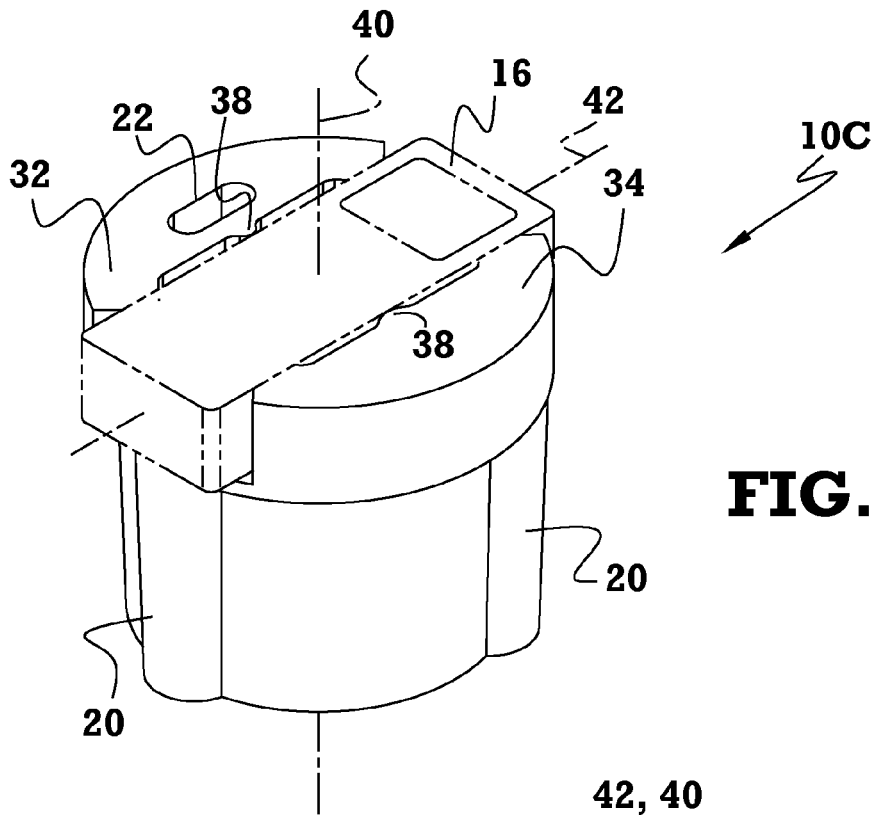
FIG. 13 is a view similar to FIG. 10 with a phone inserted in one orientation.
Figure 14:
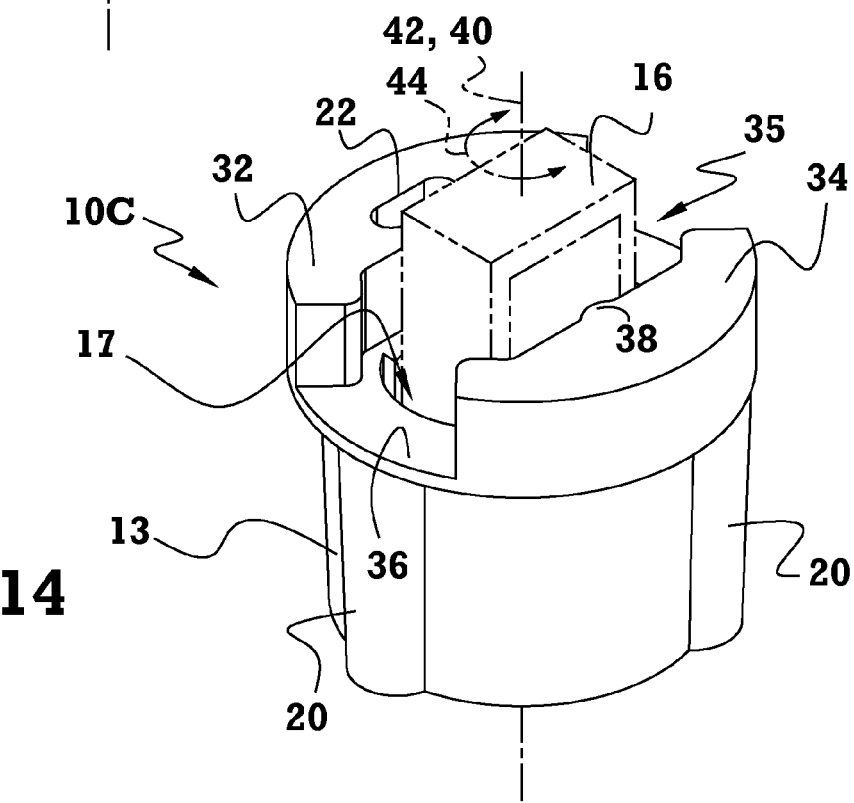
FIG. 14 is a view similar to FIG. 10 with a phone inserted in another orientation.

Referring now to FIGS. 9-14, a phone holder 10C according to a further embodiment of the invention is illustrated, wherein like parts in the previous embodiments are represented by like numerals. The phone holder 10C includes the cam segments 26 and 28, as well as raised sides 32 and 34 that extend upwardly from an upper surface 36 of the continuous side wall 13. The raised sides 32 and 34 define a gap 35 within which a phone can be inserted (FIG. 13). The raised sides are designed to grasp the phone while it is set atop the holder, e.g. while the phone rests on the upper surface 36. As shown in FIG. 13, the phone 16 has a longitudinal axis 42 that is oriented in a direction transverse to a main axis 40 of the holder 10C. In FIG. 14, the longitudinal axis 42 of the phone 16 is oriented in a direction parallel to the main axis 40. In this position, the phone is positioned without restraint in the cavity 17. As in the previous embodiment, the phone can be twisted about its axis 42, as shown by arrow 44, to move along the ever decreasing radius of the cavity 17 until it is secured and grasped by the cam segments. The combination of the cavity 17 and the raised sides 32, 34 thus provides multiple positive grasping arrangements for the phone. A pair of nubs 38 may be provided on the raised sides 32 and 34, respectively. The nubs can be deformed to grasp the phone.

As best shown in FIG. 12, the continuous side wall 13 of the holder 10C is tapered to fit into the cup holder of the vehicle. In addition, ribs 20 are provided on the outside of the side wall 13 for securing the holder 10C in the cup holder. The cavity 22 is generally oval in cross section and extends through the raised side 32 and into the side wall 13. The cavity 22 is convenient for holding writing implements, such as pens, pencils or the like, or other accessories such as ear buds or the like.

It will be understood that numerous modifications and variations of the present invention are possible in light of the above teachings. It is, therefore, to be understood that within the scope of the appended claims, the invention may be practiced otherwise than as specifically described herein.

What is claimed is:

1. A portable accessory holder for insertion into an existing vehicle cup holder, the portable accessory holder for holding a portable phone comprising:
   a. a body having a continuous side wall sized to be received within the vehicle cup holder, and an upper surface coinciding with at least a portion of the side wall;
   b. a pair of spaced sides extending upwardly from the upper surface to thereby define a gap therebetween, the gap being dimensioned to receive and hold a portable accessory, with the upper surface defining a support surface for the portable accessory;
   c. a first cavity formed within the body, the first cavity being sized for receiving a portable accessory;
   d. a second cavity formed within the body, the second cavity being located in one of the spaced sides and further sized to receive a further portable accessory; and
   e. wherein the second cavity extends into the continuous side wall.

2. A portable accessory holder for insertion into an existing vehicle cup holder, the portable accessory holder holding for holding a portable phone comprising:
   a. a body having a continuous side wall sized to be received within the vehicle cup holder and an upper surface coinciding with at least a portion of the side wall;
   b. a first cavity formed within the body, the first cavity being sized for receiving a first portable accessory;
   c. a second cavity formed within the body, the second cavity being sized to receive a second portable accessory;
   d. a pair of spaced sides extending upwardly from the upper surface to thereby define a gap therebetween, the gap being dimensioned to receive and hold one of the first and second portable accessories, with the upper surface defining a support surface for the one portable accessory;
   e. wherein the second cavity is located in one of the spaced sides; and
   f. wherein the second cavity extends into the continuous side wall.

* * * * *